Figure 1:
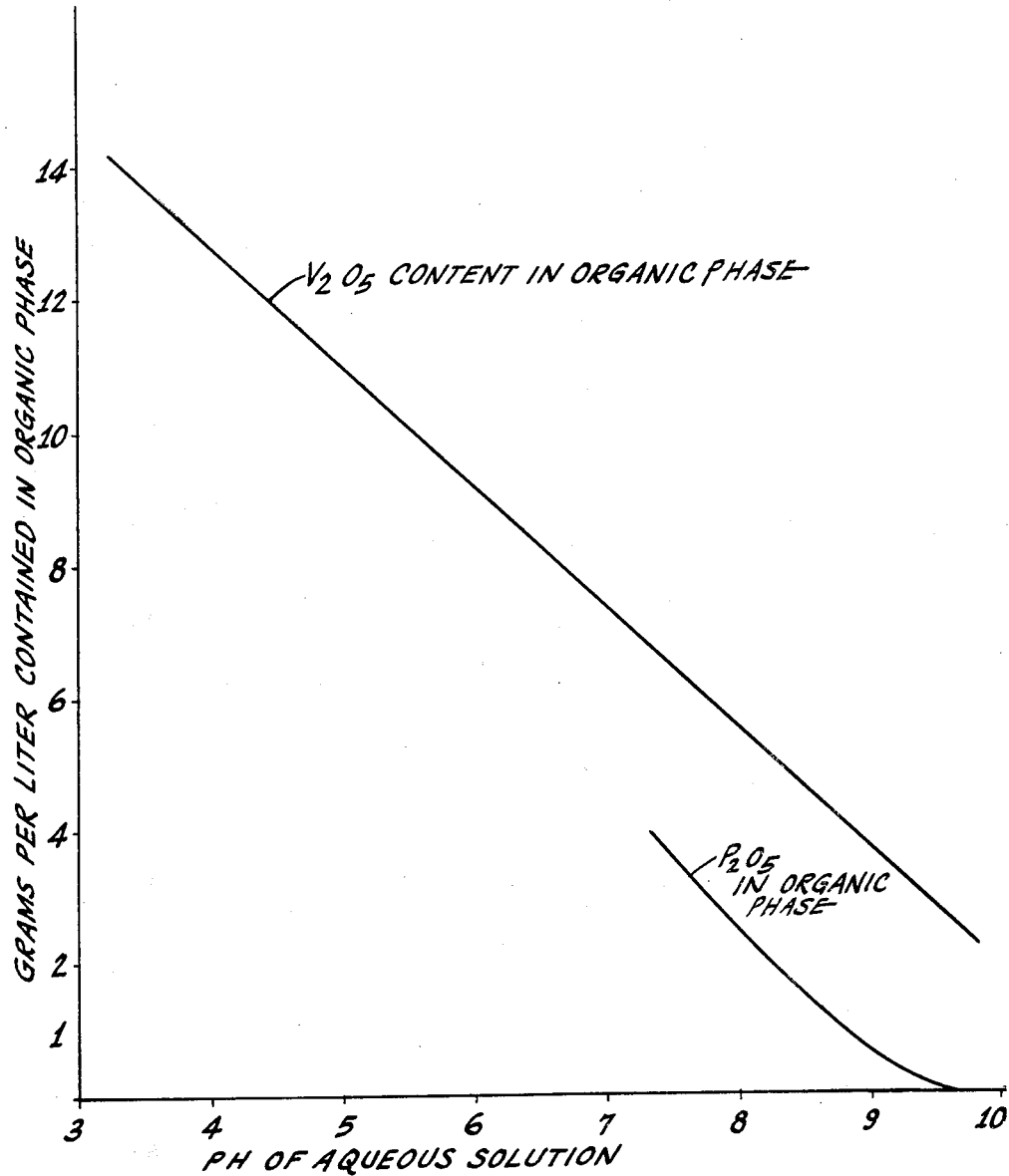

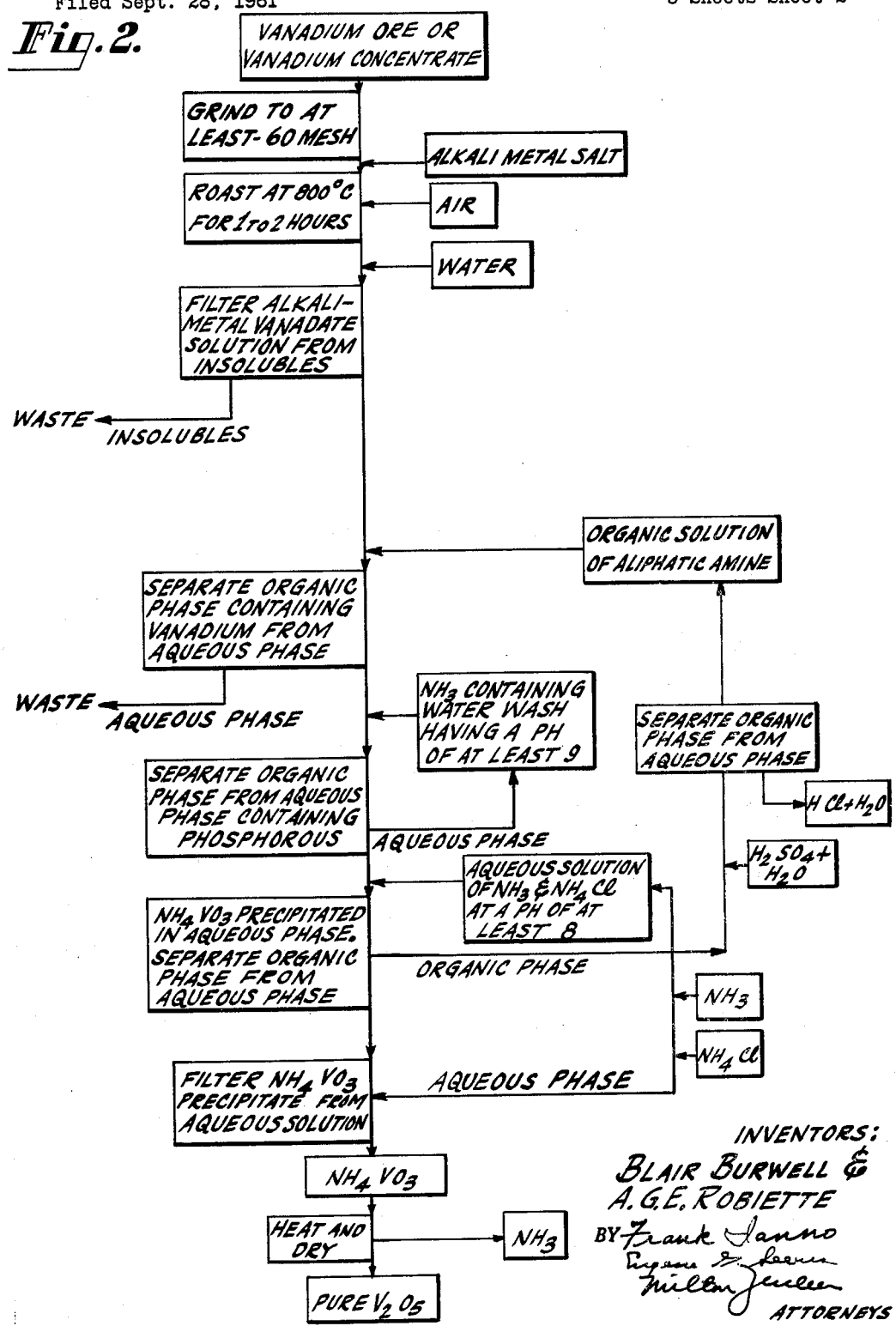

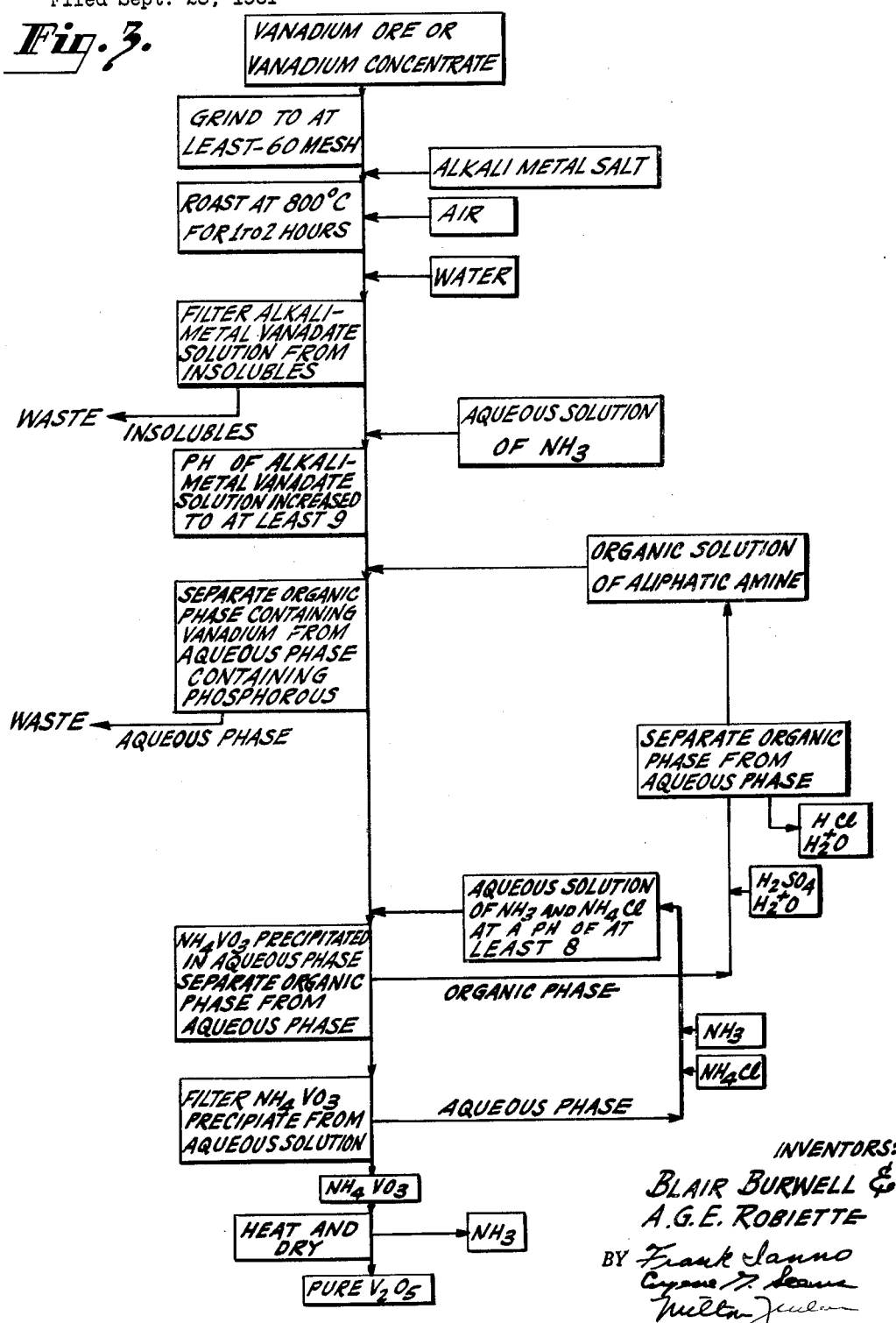

United States Patent Office
3,206,277
Patented Sept. 14, 1965

3,206,277
PROCESS FOR RECOVERING PURE
VANADIUM OXIDE
Blair Burwell, Grand Junction, Colo., and Alfred Gordon Evans Robiette, Bovingdon Herts, England, assignors to Minerals Engineering Company, Grand Junction, Colo., a corporation of Colorado
Filed Sept. 28, 1961, Ser. No. 141,500
7 Claims. (Cl. 23—18)

This invention relates to the treatment of low-grade phosphorus-containing vanadium-bearing ores or concentrates for the direct recovery of vanadium oxide having a purity of at least 99.5% $V_2O_5$ with a maximum of 0.01 $P_2O_5$.

In the treatment of ores or concentrates containing vanadium for the recovery of vanadium values, it is the custom of the industry to crush the ores to a suitable fineness, such as less than minus 60 mesh, and to roast the ore in suitable roasting furnaces with the addition of sodium salts, such as sodium carbonate, sodium sulfate or sodium chloride, at temperatures approximately of 800° C. whereupon a major portion of the vanadium contained in the ore is converted to a water-soluble salt, i.e., sodium vanadate. Upon subjecting the roasted material to a leaching step with water, the water-soluble sodium vanadate is separated from the residual solids and the residue discharged to tailing piles.

Conventionally, the vanadium is recovered from this solution by subjecting the solution to boiling temperatures with the addition of mineral acids, whereupon an impure compound of vanadium known as "red cake" separates from the solution as a solid and is removed by filtration. The remaining solution contains acid, sodium sulfate, bound phosphorus and other impurities and is discharged to waste. The "red cake" is dried and heated to produce a product containing 87% to 96% $V_2O_5$, the balance being impurities such as silicon, phosphorus and the like.

In recent years, there has been a growing use for pure vanadium oxide in the making of non-ferrous alloys, such as in metal containing titanium, chromium, vanadium and aluminum, where the sodium, iron, silicon and phosphorus content in the metal must be kept below the limits contained in convenitonal "red cake" or fused oxide. Usually, this requires a pure vanadium oxide containing more than 99.5% $V_2O_5$ and less than .10% each of sodium and silicon and less than .01% each of phosphorus, chromium and iron.

Recently, we have found that vanadium oxide of high purity can be obtained by employing a newly developed extraction procedure. This process is carried out with a class of water-insoluble amine complexing agents which serve as liquid-liquid extraction agents when used in organic solvents such as kerosene or fuel oil. The process is considered a "liquid ion-exchange process" and is carried out as follows:

(a) A vanadium ore, or vanadium concentrate, no larger than 60 mesh is roasted with an alkali metal salt at about 800° C. under full oxidizing conditions for from about 1 to 2 hours.

(b) The oxidized product of (a) is leached with water.

(c) The aqueous slurry of (b) is separated to recover a solution of alkali metal vanadate from insoluble waste.

(d) The aqueous solution of (c) is extracted with an organic solution of a water-insoluble amine to obtain a two-phase liqiud mixture.

(e) The mixture of (d) is separated into an aqueous phase which is discarded, and an organic phase containing the vanadium.

(f) The vanadium is separated from the organic phase by extraction of the organic phase with an aqueous solution of an inorganic salt (stripping agent) such as ammonium nitrate, ammonium chloride, sodium sulfate, etc., whereby the vanadium is rendered soluble in the aqueous phase of the resulting two-phase mixture.

(g) The organic phase is separated from the aqueous phase and returned for reuse in step (d).

(h) The aqueous phase from (g) containing vanadium is treated for recovery of the vanadium salt.

A serious problem which has arisen in the above process is the high amount of phosphorus contamination in the final vanadium oxide, $V_2O_5$, product. That is, some of the phosphorus values present in the vanadium ore is carried by the extracting solutions along with the vanadium into the final product. As a result, the vanadium oxide product which has been recovered from the above process has been found to contain excessive amounts of undesirable phosphorus. This contamination becomes more severe when the vanadium ore contains larger than normal amounts of phosphorus values, since more phosphorus is carried over into the $V_2O_5$ product.

This phosphorus contamination renders the otherwise suitable vanadium oxide unusable in applications where pure vanadium oxide is required, i.e., in the making of non-ferrous alloys. Removal of this phosphorus from the vanadium product is difficult and expensive, and therefore, constitutes a serious drawback to the above liquid-liquid purification procedure.

Because of these difficulties, the above process is economical only with vanadium ores containing small amounts of phosphorus.

It is an object of the present process to recover vanadium oxide of high purity from high phosphate vanadium oxide by a liquid-liquid extraction process in which the recovered vanadium oxide has a phosphorus content less than 0.01%.

It is a further object of the present process to selectively extract phosphorus from vanadium during the above liquid-liquid extraction process for obtaining highly pure (99.5%) vanadium oxide.

It is an additional object of the present process to selectively extract the phosphorus from vanadium in the organic extract phase of the above liquid-liquid extraction process without any material loss of the phosphorus extracting chemicals.

It has been found, unexpectedly, that phosphorus can be separated from vanadium, in the organic extraction step (identified as step "d") of the above process by contacting the organic extract solution with an ammonia water solution having a pH of at least about 9, and separating an aqueous phase rich in phosphorus, from an organic vanadium containing phase which contains reduced amounts of phosphorus.

The organic phase is passed forward for recovery of the vanadium values while the wash water is treated for removal of the phosphorus values and recycled for further use.

The present process will now be illustrated with reference to the drawings in which FIGURE 1 represents a graphical description of the solubility of phosphorus and vanadium in the organic extract phase at various pH values of an aqueous ammonia solution in contact with the organic phase. FIGURE 2 represents a flow sheet in block form which illustrates the chemical and physical treating operations which occur in the preferred mode of operation, and FIGURE 3 represents a flow sheet in block form which illustrates the chemical and physical operations which occur in another embodiment of the invention.

Referring now to FIGURE 1, it can be observed that the phosphorus content in the organic phase decreases as the pH of the aqueous ammonia solution in contact with the aqueous phase increases until it reaches a pH of about 9.5. At this point, the phosphorus values become virtually insoluble in the organic phase. However, at these pH values, the solubility of the vanadium in the organic phase remains sufficiently high so that economic recovery of the vanadium in the organic phase is possible.

In FIGURE 2, the chemical and physical treating operations of the preferred process are shown in block form and are carried out as follows.

Initially, it is desirable to treat the low-grade ore or concentrates to produce a solution containing sodium vanadate with a minimum of soluble silicon, iron, chromium and phosphorus. This is accomplished by grinding the ore to suitable fineness, usually less than 60 mesh, and roasting it with an alkali metal salt at temperatures of approximately 800° C. for 1 to 2 hours under fully oxidizing conditions. Preferably, the roaster gases should be adjusted to contain in excess of 8% $O_2$ in order to fully oxidize ferric chloride to ferric oxide, calcium chloride to calcium oxide and to avoid the formation of soluble iron salts. Sodium chloride is the preferred alkali metal salt because it minimizes the formation of soluble sodium silicate, sodium aluminate, sodium chromate and sodium phosphate which are objectionable in subsequent steps of this process. The roasted ore is leached with water and the residue separated from the leach solution. The recovered leach solution generally has a pH of between 5.5 and 7.

The leach solution is then intimately mixed with a water-insoluble, substituted amine complex dissolved in an organic solvent such as kerosene or fuel oil. This organic solution serves as a liquid-liquid solvent extraction agent, although the procedure is also referred to as a "liquid ion-exchange process." These amines are present as organic complexes containing sulfate ions in the molecule. Their operation is described in "Fatty Nitrogen Chemicals in Mineral Concentration" (1959), supplied by the Chemical Divisions of General Mills. Of the amines which have been found suitable, the preferred ones are the tertiary alkyl amines, particularly those containing saturated straight chain groups of 8 to 10 carbon atoms, which have been treated to provide sulfate ions in the molecule, as by treatment with aqueous sulfuric acid.

If properly carried out, in excess of 99% of the vanadium contained in the water solution will be transferred to the organic extract solution. This is accomplished by using sufficient organic solution to react with all the vanadium in the aqueous solution. The amount required is generally determined by laboratory test methods preceding the operation. Usually, sufficient organic is supplied so that, after mixing, it will contain from 2.5 to 15 grams of $V_2O_5$ per liter, and the separated water solution from a trace to .1 gram $V_2O_5$ per liter. In this way, the vanadium oxide is transferred from its sodium-bearing molecule in the water solution to the water-insoluble organic phase as a vanadium amine complex.

The organic phase is then washed with an ammonia solution having a pH of at least about 9 to remove phosphorous present in the organic phase. The resulting mixture is separated into an aqueous phase containing phosphorus and an organic phase containing the vanadium. The separated aqueous solution is then treated for removal of the phosphorus values, e.g., by adding magnesium chloride or magnesium oxide to the water to precipitate magnesium ammonium phosphate, when the phosphorus content builds up beyond tolerable concentrations. The wash water is separated from the precipitate by filtration or centrifugation. Enough ammonia is replaced in the wash water to maintain the pH at a minimum of about 9 and the wash water is recirculated for further use. The term ammonia as used in the herein specification and claims refers to both gaseous ammonia and to aqueous solutions of ammonium compounds which will produce the desired pH.

The organic phase containing the vanadium is then treated for removal of its vanadium value. This can be done in a conventional manner (not illustrated in FIGURE 2) by stripping the organic phase of its vanadium values with an aqueous inorganic salt solution, whereby the vanadium becomes soluble in the aqueous stripping solution. Upon continuous standing, the vanadium precipitates from the aqueous stripping solution.

An improved procedure for recovering the vanadium from the organic extract is described in our co-pending application, Serial No. 141,340, filed on even date herewith and is illustrated in FIGURE 2. This is accomplished by mixing the organic extract with an aqueous solution containing ammonia and ammonium chloride. Sufficient chloride ions from the ammonium chloride must be present to displace the vanadium ions in the organic phase. The liberated vanadium ions form ammonium metavanadate in the aqueous extract. The ammonia metavanadate immediately precipitates in the aqueous extract if enough additional ammonium chloride is present to form at least a 9% by weight solution of the ammonium chloride, and if ammonia is present in sufficient amounts to maintain the aqueous extract at a pH in excess of about 8. The preferred concentrations in the aqueous extract solution, expressed as free ammonia and ammonium chloride, are 1% ammonia and 14% ammonium chloride.

After thoroughly mixing the vanadium-bearing organic phase with an aqueous solution containing combinations of ammonia and ammonium chloride as described, the organic mixture is separated from the aqueous phase by settling. The vanadium oxide content of the organic phase is contained in a white precipitate in the aqueous solution in the form of pure ammonium metavanadate which can be readily separated from the aqueous extract. The separated ammonium metavanadate is dried and marketed as ammonium metavanadate, or heated to expel the ammonia and marketed as pure vanadium oxide.

The separated aqueous solution obtained during the filtration of the solid ammonium metavanadate is of high purity and is returned for reuse in the circuit. Similarly, the separated organic mixture, stripped of its vanadium, is regenerated and also returned for reuse, thus establishing an economic and easily operated vanadium recovery circuit. The regeneration merely involves replacing the chloride ions in the amine molecule with sulfate ions, by washing the organic solution with an aqueous sulfuric acid solution.

Since the ammonium chloride-ammonium hydroxide aqueous solution used in recovering the vanadium from the organic solution can be reused, its concentration is maintained sufficiently high so that quick and complete extraction of the vanadium from the organic solution takes place. It is desirable, but not essential, to maintain the concentration of ammonium chloride in excess of 14%. This is effected by replacing ammonia and chlorine, in any convenient form, in the recycled solution in the quantity consumed in the reaction. Accordingly, the only consumption of ammonia and chlorine in this cyclic circuit is the ammonia contained in the ammonium metavanadate and the chlorine required to displace the vanadium anion in the organic phase. Practically, this has been found to be approximately .44 pound of $NH_3$ per pound of $V_2O_5$ and .21 pound of $Cl_2$ per pound of $V_2O_5$ recovered.

An alternate procedure for reducing the phosphorus content in the organic extract phase is illustrated in FIGURE 3. The process is similar to that illustrated in FIGURE 2 except that no ammonia wash solution is employed. Instead, the aqueous leach solution of alkali metal vanadate (identified as step "c" above) is raised to a pH of at least about 9 by the addition of ammonia, before it is extracted with the organic solution of water-insoluble amine (identified as step "d" above). At these pH values loading of the phosphorus from the aqueous phase to the organic phase is prevented, because of the low solubility of the phosphorus in the organic phase. This low solubility of the phosphorus in the organic extract phase is illustrated in FIGURE 1, and occurs whenever an aqueous ammonia solution in contact with the organic extract phase has a pH of at least about 9.

However, at these pH values, the loading of the vanadium from the aqueous solution to the organic extract phase is not prevented up to about 3 to 4 grams of $V_2O_5$ per liter of organic extract. This is illustrated in FIGURE 1, wherein the solubility of $V_2O_5$ is between 3 to 4 grams/liter of organic extract solution, when the pH of the aqueous ammonia solution in contact with the organic phase is about 9. Thus, if the aqueous solution containing the alkali metal vanadate is adjusted to a pH of at least about 9 by ammonia addition, before being extracted with the organic solution, selective extraction of the vanadium from the phosphorus takes place.

This alternate procedure is not the preferred embodiment of the present invention for plant use because the ammonia which is added to the aqueous alkali metal vanadate solution to increase its pH to at least about 9, must be discarded along with other minerals and impurities present in the residual aqueous solution after the vanadium values have been extracted. This results in an undesirable loss of ammonia, because economic recovery of the ammonia from the aqueous residue is not feasible. In contrast, the preferred method permits removal of the phosphorus impurity with recycle of the ammonia-containing aqueous-extracting solution without loss of ammonia, and is therefore more desirable for continuous plant operation.

The following example is representative of the preferred method for producing the present invention which is, of course, not limited thereto.

Five tons of vanadium-bearing concentrates containing 11.8% $V_2O_5$, 10.22% $Cr_2O_3$, 41.4% $P_2O_5$, 35.5% $Fe_2O$ was ground to minus 80 mesh and mixed with 30% sodium chloride. It was then roasted in an excess of air for 30 minutes at a temperature of 780° C. The calcine was quenched with water and the vanadium-bearing solution separated by filtration from the solids. This solution contained 8.98% $V_2O_5$, 0.14% $P_2O_5$, trace $Cr_2O_3$ and trace FeO. Eighty-one percent of the vanadium in the concentrate was recovered in the solution. A portion of the solution was then treated for vanadium recovery as follows.

One hundred ml. of the solution was mixed with 1000 ml. of an organic solution for 10 minutes. This solution was made up of a mixture of modified tertiary alkyl amines, each having 3 saturated straight chains of 8 to 10 carbon atoms each, with 95% by weight of the mixture containing the 8 carbon length chains, 10 parts of isodecanol and 80 parts of kerosene. The modification of the amines involved treatment with an aqueous solution of $H_2SO_4$ to form the corresponding amine sulfate salt. The solutions were then settled and samples taken for an analysis. The aqueous solution assayed trace $V_2O_5$, trace $Cr_2O_3$ and 0.10 $P_2O_5$. The separated organic contained 0.89% of $V_2O_5$ and 0.004% $P_2O_5$. The separated organic solution was then mixed with 100 ml. of an ammonium hydroxide solution containing the equivalent of 1% $NH_3$ and the mixture settled. The organic phase was found to contain 0.89% $V_2O_5$ and no detectable phosphorus. The ammonia solution contained trace $V_2O_5$ and 0.04% $P_2O_5$.

The organic phase which was subjected to the ammonia water wash was then mixed with 100 ml. of solution containing 1% ammonia and 14% ammonium chloride for 10 minutes. The resulting mixture was settled and separated into an organic solution and an aqueous solution. The organic solution contained a trace of vanadium while the ammonia-containing solution contained a solid precipitate of white ammonium metavanadate. This was separated by filtration and the solution treated with a chlorine gas until it contained 14% ammonium chloride and sufficient ammonia gas until it contained 1% of ammonium.

A series of 5 more portions of vanadium-bearing solution was then treated with the organic mixture in a cyclic manner as described above by reusing the organic phase, the ammonia wash liquor used to remove phosphorus, and the ammonia-ammonium chloride solution of the first run.

The ammonium metavanadate from the 6 cycle tests were combined and dried and calcined at 1300° C. It weighed 53.4 grams and contained 99.98% $V_2O_5$, trace phosphorus, 0.01% sodium and trace chromium. The ammonia wash liquor contained 0.23% $P_2O_5$.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In a process of recovering vanadium compounds in excess of 99.5% purity from vanadium-bearing material containing material amounts of phosphorus, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 7 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities including most of the phosphorus impurities, discharging the separated aqueous phase containing the insoluble impurities from the treatment, washing the separated organic phase with an aqueous ammonia solution having a pH of at least about 9 for extracting phosphorus material of the organic phase into the aqueous phase, separating the organic phase from the aqueous phase containing the phosphorus material, extracting the vanadium ion from the separated organic phase by mixing with an aqueous solution containing ammonium chloride and ammonia in quantities not less than 12% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the ammonium vanadate from the aqueous phase by filtration, and subjecting the crystalline ammonium metavanadate to heating to form pure vanadium pentoxide containing not less than 99.5% $V_2O_5$.

2. In a process of recovering vanadium compounds in excess of 99.5% purity from vanadium-bearing material containing material amounts of phosphorus, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 7 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities including most of the phosphorus impurities, discharging the separated aqueous phase containing the insoluble impurities from the treatment, washing the separated organic phase with an aqueous ammonia solution having a pH of at least about 9 for extracting phosphorus material of the organic phase into the aqueous phase, separating the organic phase from the aqueous phase containing the phosphorus material, separating a portion of the aqueous phase without solid inclusion for recycling to the wash liquid introduction stage, replacing ammonia in the recycled liquid to maintain a ph of at least 9, extracting the vanadium ion from the separated organic phase by mixing with an aqueous solution containing ammonium chloride and ammonia in quantities not less than 12% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the ammonium vanadate from the aqueous phase by filtration, and subjecting the crystalline ammonium metavanadate to heating to form pure vanadium pentoxide containing not less than 99.5% $V_2O_5$.

3. In a process of recovering vanadium compounds in excess of 99.5% purity from vanadium-bearing material containing material amounts of phosphorus, including roasting such as vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 7 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities including most of the phosphorus impurities, discharging the separated aqueous phase containing the insoluble impurities from the treatment, washing the separated organic phase with an aqueous ammonia solution having a pH of at least about 9 for extracting phosphorus material of the organic phase into the aqueous phase, separating the organic phase from the aqueous phase containing the phosphorus material, precipitating magnesium ammonium phosphate in the aqueous solution by magnesium chloride introduction, removing the precipitate from the solution by filtration, extracting the vanadium ion from the separated organic phase by mixing with an aqueous solution containing ammonium chloride and ammonia in quantities not less than 12% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the ammonium vanadate from the aqueous phase by filtration, and subjecting the crystalline ammonium metavanadate to heating to form pure vanadium pentoxide containing not less than 99.5% $V_2O_5$.

4. In a process of recovering vanadium compounds in excess of 99.5% purity from vanadium-bearing material containing material amounts of phosphorus, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 7 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities including most of the phosphorus impurities, discharging the separated aqueous phase containing the insoluble impurities from the treatment, washing the separated organic phase with an aqueous ammonia solution having a pH of at least about 9 for extracting phosphorus material of the organic phase into the aqueous phase, separating the organic phase from the aqueous phase containing the phosphorus material, precipitating magnesium ammonium phosphate in the aqueous solution by magnesium oxide introduction, removing the precipitate from the solution by filtration, extracting the vanadium ion from the separated organic phase by mixing with an aqueous solution containing ammonium chloride and ammonia in quantities not less than 12% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavandate in the form of a slurry in the aqueous phase, separating the ammonium vanadate from the aqueous phase by filtration, and subjecting the crystalline ammonium metavanadate to heating to form pure vanadium pentoxide containing not less than 99.5% $V_2O_5$.

5. In a process of recovering vanadium compounds in excess of 99.5% purity from vanadium-bearing material containing material amounts of phosphorus, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 7 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities including most of the phosphorus impurities, discharging the separated aqueous phase containing the insoluble impurities from the treatment, washing the separated organic phase with an aqueous ammonia solution having a pH of at least about 9 for extracting phosphorus material of the organic phase into the aqueous phase, separating the organic phase from the aqueous phase containing the phosphorus material, extracting the vanadium ion from the separated organic phase by mixing with an aqueous solution containing ammonium chloride and ammonia in quantities not less than 12% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the ammonium vanadate from the aqueous phase by filtration, recycling the separated aqueous phase to the ammonia introduction stage, and subjecting the crystalline ammonium metavanadate to heating to form pure vanadium pentoxide containing not less than 99.5% $V_2O_5$.

6. In a process of recovering vanadium compounds in excess of 99.5% purity from vanadium-bearing materials containing material amounts of phosphorus, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 7 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities including most of the phosphorus impurities, discharging the separated aqueous phase containing the insoluble impurities from the treatment, washing the separated organic phase with an aqueous ammonia solution having a pH of at least about 9 for extracting phosphorus material of the organic phase into the aqueous phase, separating the organic phase from the aqueous phase containing the phosphorus material, extracting the vanadium ion from the separated organic phase by mixing with an aqueous solution containing ammonium chloride and ammonia in quantities not less than 12% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the ammonium vanadate from the aqueous phase by filtration, recycling the separated aqueous phase to the ammonia introduction stage, adding enough ammonia to said solution before its reintroduction to replace the amount reacted in the preceding cycle, and subjecting the crystalline ammonium metavanadate to heating to form pure vanadium pentoxide containing not less than 99.5% $V_2O_5$.

7. In a process of recovering vanadium compounds in excess of 99.5% purity from vanadium-bearing material containing material amounts of phosphorus, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 7 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities including most of the phosphorus impurities, discharging the separated aqueous phase containing the insoluble impurities from the treatment, washing the separated organic phase with an aqueous ammonia solution having a pH of at least about 9 for extracting phosphorus material of the organic phase into the aqueous phase, separating the organic phase from the aqueous phase containing the phosphorus material, extracting the vanadium ion from the separated organic phase by mixing with an aqueous solution containing ammonium chloride and ammonia in quantities not less than 12% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the ammonium vanadate from the aqueous phase by filtration, recycling the organic phase to the three-phase mixture stage after precipitating the ammonium metavanadate, introducing a sulfuric acid solution into the organic phase before reintroduction into the three-phase mixture stage, and subjecting the crystalline ammonium metavanadate to heating to form pure vanadium pentoxide containing not less than 99.5% $V_2O_5$.

References Cited by the Examiner
UNITED STATES PATENTS

| | | | |
|---|---|---|---|
| 2,227,833 | 1/41 | Hixon | 23—19 X |
| 2,771,341 | 11/56 | Barth | 23—51 |
| 2,877,250 | 3/59 | Brown et al. | 23—312 X |
| 3,052,516 | 9/62 | Drobnick et al. | 23—51 |
| 3,067,008 | 12/62 | Pilloton | 23—140 |
| 3,083,085 | 3/63 | Lewis et al. | |

OTHER REFERENCES

Coleman et al.: "Proceedings of International Conference on Peaceful Uses of Atomic Energy," vol. 28, pages 278 to 288 (1958).

MAURICE A. BRINDISI, *Primary Examiner.*